L. Lillie,

Burglar-Proof Safe.

No. 2,112. Reissued Nov. 21, 1865.

Witnesses:

Marcus P. Norton

Edw. R. Brown

Inventor:

Lewis Lillie

UNITED STATES PATENT OFFICE.

LEWIS LILLIE, OF TROY, NEW YORK.

IMPROVEMENT IN THE CONSTRUCTION OF SAFES.

Specification forming part of Letters Patent No. 8,223, dated July 15, 1851; extended seven years; Reissue No. 2,112, dated November 21, 1865.

*To all whom it may concern:*

Be it known that I, LEWIS LILLIE, of the city of Troy, county of Rensselaer, and State of New York, have invented new and useful Improvements in Burglar and Fire Proof Safes, Vaults for Banks, Stores, &c., Bank and Vault or other Doors, upon which Letters Patent of the United States of America were granted and delivered to me bearing date the 15th day of July, A. D. 1851, and which Letters Patent were duly extended or renewed, as by the law provided, on or about the 15th day of July, A. D. 1865, for a new term of seven years from and after the said 15th day of July, 1865; and I do hereby declare that the following is a clear, full, and exact description of the nature, construction, and mode of constructing the same, reference being hereby had to the accompanying drawings, and to the letters of reference marked thereon, which said drawings make a part of this specification.

Like letters represent and refer to like or corresponding parts.

Figure 1:
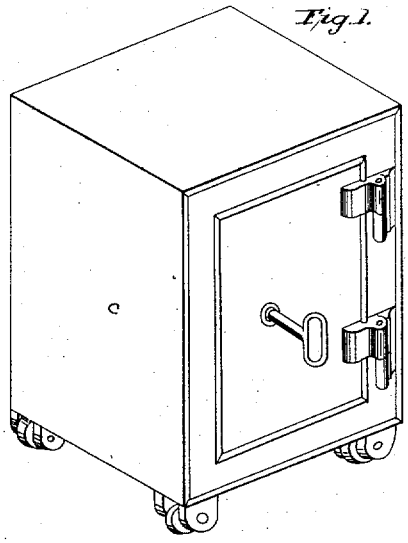
Figure 2:
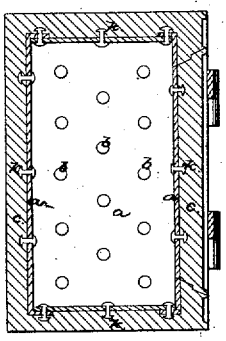
Figure 3:
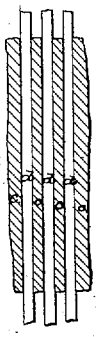
Figure 4:
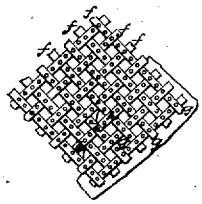
Figure 5:
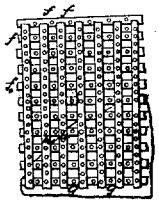

Figure 1 is a perspective view of a safe completed and ready for practical use. Fig. 2 is a vertical section of my said improved burglar and fire proof safe on a vertical line near the hinges of the door thereof, and shows perforations to receive the molten cast-iron, in the manner substantially as hereinafter described and set forth. It also shows the mode or manner of fastening the corners of the plate-iron together by means of rivets, and the combining of the same with the cast-iron, which cast-iron becomes chilled or hardened by and upon the said wrought-iron plate or frame-work, as hereinafter described. Fig. 3 shows a frame-work made of wrought-iron bars, upon and around which is constructed the cast-iron, chilled or hardened, and firmly secured thereto, in the manner substantially as herein described and set forth. Fig. 4 shows wrought-iron bars interlacing or interwoven, and perforated so as to receive the said cast-iron, in the manner and for the purposes substantially as hereinafter described and set forth. Fig. 5 shows wrought-iron bars crossing each other, and not interwoven or interlaced, but perforated so as to receive and retain the aforementioned cast-iron, in the manner and for the purposes substantially as hereinafter described and set forth.

The nature of my aforesaid invention and improvements consists in the construction of a burglar and fire proof safe, vault for banks, stores, &c., and for bank-door, vault, safe, or other door, of wrought and cast iron, which cast-iron shall be chilled or hardened, and the wrought and cast iron combined, in the manner and for the purposes substantially as hereinafter described and set forth. The wrought-iron, arranged and combined in the manner substantially as herein described and set forth, will prevent the said safe, vault, or doors from being broken into parts or pieces by burglars, while at the same time the said cast-iron, chilled or hardened at and by the casting thereof upon or around the said wrought-iron, in the manner substantially as herein described and set forth, will prevent any entrance into such safe, vault, or through such doors, by any burglar in the accomplishment of his designs or intentions at theft, robbery, &c. It is therefore manifest that by this arrangement and combination of wrought and cast iron, chilled or hardened, as herein described and set forth, I make a safe, vault, chest, box, bank-door, safe, vault, or other door which cannot be broken into parts or pieces or drilled through by any burglar or burglars, and therefore and by means thereof money, papers, or other valuable property is protected and preserved from burglars, as well as from destruction or loss by fire.

Having thus described the nature of my aforesaid invention and improvements, and to enable others skilled in the art to which the same relates to make and put it into practical use, I will here proceed to describe the construction and the mode or manner of constructing safes, vaults for banks, stores, &c., and safe, vault, bank, or other doors containing my said invention and improvements, which are as follows, to wit:

I make a wrought-iron frame, *a*, Fig. 2, of boiler-plate iron, which is made in as many parts as there are sides to the safe or vault, and which parts are firmly riveted together at the corners thereof by means of the rivets or bolts *k*, Fig. 2, which rivets project outward from the said wrought-iron frame, so as to receive and firmly hold the said cast-iron upon the said corners, while the body portions of such safe or vault shall be firmly united to and upon the said frame by means of the molten iron passing into and through the openings or apertures *b*, Fig. 2, which of course forms cast-iron rivets, and thus combines the wrought and cast iron parts together, and thereby adds great strength to such safe or vault or door. The said rivets or bolts *k* will contain upon each end thereof a flange or head, as shown in said Fig. 2.

*a*, Fig. 2, is the boiler plate-iron frame, and is perforated, as aforesaid, and as shown at *b*, same figure, with any number or size of openings or perforations deemed best, so as to allow the molten iron to enter therein and through the said frame, for the purpose of firmly uniting the aforesaid wrought and cast iron, and thereby contribute great strength and durability to said safe, vault, doors, &c. The molten iron, during the casting upon such wrought-iron frame, is prevented from running into and filling up the interior portion of the said safe or vault through the said openings or perforations by means of the inner core, which is made of sand in the usual way or of iron, and thus the cast iron rivets are formed, extending entirely through the thickness of such wrought-iron. The said wrought-iron frame is firmly secured at the respective corners thereof, as aforesaid, before the process of casting and chilling or hardening of the iron commences, by means of the aforesaid rivets or bolts *k*, Fig. 2. The outer end of the said rivets are surrounded by the molten cast iron at the same time that the said openings or apertures *b*, Fig. 2, are filled with the same material, and thus forming the aforesaid cast-iron rivets or pins. I also construct the said frame of a series of wrought-iron bars, which may be of any width or thickness desired, while the length thereof will of course correspond to and with the size of the safe, vault, or door to be made. *d d d*, Fig. 3, show such wrought-iron bars, while *c*, same figure, shows the aforesaid cast-iron, chilled or hardened, as aforesaid. The said bars may be entirely surrounded or covered by said cast-iron, and not in the least change the main feature or character of my said invention and improvements; or they may receive the molten cast-iron upon three sides only, in the manner substantially the same as that of the aforesaid boiler-plate iron, perforated as aforesaid, and by the use of an inner core for and during the process of the casting, for the purposes as aforesaid. The said wrought-iron frame may also be constructed as shown at Fig. 4, in which the aforesaid wrought-iron bars cross each other and are interlaced or interwoven. The said bars may so cross each other upon any desirable angle, and may be perforated, as shown at the small circles *h* of said Fig. 4, if deemed best so to do. In said Fig. 4 the said wrought-iron bars are represented by the letter *f*, and the aforesaid cast-iron, chilled or hardened as aforesaid, is there represented by the letter *g*. The said bars thus interwoven and thus crossing each other may also be cast upon by the said molten cast-iron as aforesaid, and may be entirely surrounded or covered by the said cast-iron, chilled or hardened as aforesaid, without changing the main feature or character of my said invention or improvements. The said wrought-iron frame may also be constructed as shown at Fig. 5, in which the aforesaid wrought-iron bars will cross each other without being interlaced or interwoven, as hereinbefore described, but which cross each other upon an air-line surface of such bars, which would give even or parallel surfaces to said bars. The said bars thus crossing each other may also be perforated, as seen at the small circles *h* in said Fig. 5. The cast-iron, chilled or hardened, as aforesaid, is in said figure represented by the letter *g*, while the said wrought-iron bars are represented by the letter *f*, and they may also cross each other upon any angle desired. They may also be cast upon in the manner substantially the same as that described in relation to the aforesaid perforated boiler-plate iron; or they may be entirely covered or surrounded by the said cast-iron during the process of the casting, as aforesaid, without changing the main feature or character of my said invention and improvements. There may also be used two or more such wrought-iron frames as I have hereinbefore described and set forth, in the construction of safes, vaults, or doors as aforesaid, if deemed best, in order to give greater and additional strength thereto, in which case such frames of wrought-iron would of course be placed at a small distance apart, and each would be surrounded by the said cast-iron, except the inner one, which of course would be cast upon in the manner aforesaid, and thus would form a safe, vault, or door of great strength and durability.

The aforesaid perforations or apertures I usually construct of from five-eighths of an inch to one inch in diameter, and countersink on one or both sides thereof, as the case may require, so that when the molten cast-iron shall have formed the aforesaid rivets they will be dovetailed in the aforesaid wrought-iron frame. It is therefore manifest that any size or number of such apertures may be used in the construction of such safes, vaults, or doors, as hereinbefore stated.

When a series of wrought iron bars are used, crossing each other, as hereinbefore stated, it will not be necessary to use the aforesaid apertures, though they may be used for the purposes aforesaid, if deemed best, so to do. The aforesaid wrought iron bars I usually rivet or anchor together at the respective corners of such safe or vault in any manner or by any means required to give great strength to such corners; or they may be sufficiently held or anchored at such corners of such safe or vault by means of the cast-iron. The said bars, when not made of wrought-iron, as aforesaid, may be of cast-steel or semi-steel, or of any other material which will give great strength to the said safe, vault, or doors, and answer any other purpose required of them in the construction and manufacture of my said burglar and fire proof safe, vault, or doors.

Should it be deemed best to use more than one frame constructed in the manner substantially the same as afore described, one might be in whole or in part made of cast-steel and one or more of wrought-iron, as aforesaid, and each and every of them surrounded by the molten cast-iron, as aforesaid. Such would be but a modification of my said invention and improvements in burglar and fire proof safes, vaults, or doors. There are other modifications of my said invention which I do not deem material here to describe and set forth. I have in this specification described and set forth such modifications of my said invention as I deem material and essential.

Any desired or required thickness or quantity of said cast-iron may be used and chilled or hardened, as aforesaid, all depending upon the size of safe, vault, or door to be made and put into use.

The said wrought-iron frame, constructed in the manner substantially as hereinbefore described and set forth, is in part for the purpose of receiving the aforesaid cast-iron, placed upon and around a core constructed for that purpose, which is the inner mold, and which is made in the usual manner of making cores, or it may be made of iron. The thickness of the said cast-iron is then determined by the means of the inside of the mold which forms the outside of the safe, vault, or door, and the mold for such safe or vault or door being thus completed, or in any manner substantially the same for the same purpose, the operation of pouring the molten iron commences. The said wrought-iron frame then and thereby becomes connected to and combined with the said cast-iron in the most perfect, complete, and durable manner, and thus and thereby forms a safe, vault, or door, as aforesaid, of combined wrought and cast iron, chilled or hardened, and of great strength, as aforesaid.

The said cast-iron is chilled or hardened by means of its contact and union upon and with the said wrought-iron frame, in the manner as hereinbefore described and set forth. It being thus chilled or hardened, it cannot be drilled through by any burglar without detection within a short or reasonable time after the commencement of such attempted drilling, and were it possible to drill entirely through the said cast-iron, chilled or hardened as aforesaid, it would require much more time and more powerful machinery than burglars usually have to carry on and out their intentions and designs at theft or robbery.

An iron mold to form the inside or outside of the aforesaid safe, vault, or doors may be used, which would then chill or harden the immediate outside as well as the inside of the said safe, vault, or doors. When an iron mold is only used to form the outside of such safe, vault, or door, such immediate outside will become chilled or hardened by means thereof, while the said wrought iron frame will also chill or harden that part of such cast-iron as shall come in contact therewith, as aforesaid; and by hardening or chilling the immediate outer surface, as aforesaid, it would contribute much on the start to destroy the tools used by the burglar, and thereby greatly discourage his said work and undertaking. The said cast-iron being thus acted upon by the aforesaid wrought-iron frame, adheres to it, and is thereto firmly bound and secured by means of such surrounding of the said bars themselves by the said cast-iron, as aforesaid, or by means of the said molten iron passing into and through the aforesaid perforations, and thereby forming a series of rivets of cast-iron, by means of which the said cast and wrought iron are firmly fastened or secured together, for the purposes as aforesaid.

It will be seen that the said boiler-plate-iron frame, as well as the wrought-iron bars, may be entirely and most thoroughly surrounded by the said cast-iron during the operation or process of the casting or pouring of the molten iron thereto, as aforesaid.

It is not considered essential or material as to where the said wrought-iron frame should be located in relation to the cast iron, so long as the same effect is produced—to wit, the combination of the wrought-iron and cast-iron, chilled or hardened as aforesaid, and thereby forming a burglar and fire proof safe, vault, or doors, for the purposes herein described and set forth.

The aforesaid wrought-iron bars may be placed or arranged at any desired distance apart or from each other in the series of such bars which make up the frame-work to receive, contain, and firmly hold the aforesaid cast-iron, in the manner and for the purposes substantially the same as hereinbefore described and set forth. Each side of such safe or vault, as well as the said doors, will therefore be composed of a series of such bars, for the purposes aforesaid; or each side thereof may be composed of such perforated boiler-plate, for the purposes aforesaid. In either case the real invention is the same, and which is herein described and set forth.

The aforesaid combination and construction of wrought-iron and cast-iron, chilled or hardened as aforesaid, forms a safe, vault, or door of great strength and durability, and not liable to be broken by any ordinary power which burglars may bring to bear upon and against either, and also renders the same firm and secure against being drilled through, and therefore proof against burglars.

The aforesaid chilling or hardening should be carried to as great a degree as possible—that is to say, the said cast-iron should be made as hard as it can be in the manner aforesaid, for by so doing the structure becomes the more secure against the burglar's drill or machinery used by him for the purpose of drilling or cutting into parts or pieces such safe, vault, or door.

To contribute in the making of my said safe, vault, or door fire proof, I use a filling composed of fire-proof material, which is placed between the inner part or side of the said wrought and cast iron structure and an inner casing of iron or wood, which said filling may be of any thickness desired, and surrounding the said structure upon the inside thereof in the usual manner.

Having thus described the nature, construction, and the mode of the manufacture of my said invention and improvements in safes, vaults, doors, &c., what I claim, and desire to secure by Letters Patent of the United States of America, is—

1. The employment of wrought-iron and cast-iron in combination, the same forming a safe, vault, or door, in the manner and for the purposes substantially as herein described and set forth.

2. A safe, vault, or door constructed of a series of wrought-iron bars and surrounded by cast-iron, in the manner substantially as and for the purposes herein described and set forth.

3. A safe, vault, or door constructed of boiler-plate iron, perforated and riveted together by means of the rivets *b* and cast-iron, in the manner and for the purposes substantially as herein described and set forth.

4. A safe, vault, or door containing cast-iron, chilled or hardened in the manner and by the means and for the purposes substantially as herein described and set forth.

5. A safe, vault, or door constructed burglar-proof, in the manner and by the means substantially as herein described and set forth.

In testimony whereof I have, on this 15th day of July, A. D. 1865, hereunto set my hand.

LEWIS LILLIE.

In presence of—

MARCUS P. NORTON,
EDM. F. BROWN.